US007022363B2

(12) United States Patent
Cui et al.

(10) Patent No.: US 7,022,363 B2
(45) Date of Patent: Apr. 4, 2006

(54) PROCESS AND APPARATUS FOR FLAXSEED COMPONENT SEPARATION

(75) Inventors: Wuwei Cui, Guelph (CA); Nam Fong Han, Brampton (CA)

(73) Assignee: Her Majesty the Queen in right of Canada, as represented by the Minister of Agriculture and Agri-Food, Guelph (CA)

( * ) Notice: Subject to any disclaimer, the term of this patent is extended or adjusted under 35 U.S.C. 154(b) by 8 days.

(21) Appl. No.: 10/316,892

(22) Filed: Dec. 12, 2002

(65) Prior Publication Data

US 2003/0136276 A1    Jul. 24, 2003

Related U.S. Application Data

(63) Continuation-in-part of application No. 10/013,494, filed on Dec. 13, 2001, now abandoned.

(51) Int. Cl.
 *A23L 1/36* (2006.01)
(52) U.S. Cl. .................. 426/482; 426/483; 426/629
(58) Field of Classification Search ............... 426/634, 426/482, 483, 629
See application file for complete search history.

(56) References Cited

U.S. PATENT DOCUMENTS

| 4,165,133 A * | 8/1979 | Johnson ................... 406/109 |
| 5,705,618 A | 1/1998 | Westcott et al. |
| 5,837,256 A | 11/1998 | Clark et al. |
| 5,846,944 A | 12/1998 | Prasad |
| 2003/0060420 A1 * | 3/2003 | Heintzman et al. ........... 514/22 |

FOREIGN PATENT DOCUMENTS

| CA | 2167951 | 7/1997 |
| CA | 2304303 | 9/2001 |
| DE | 3839778 A1 | 5/1990 |
| WO | WO 96/30468 | 3/1996 |

OTHER PUBLICATIONS

J.F. Carter, "Potential of Flaxseed and Flaxseed Oil in Baked Goods and Other Products in Human Nutrition", Cereal Foods World, vol. 38, No. 10, pp. 753-759, Oct. 1993.

(Continued)

*Primary Examiner*—Anthony Weier
(74) *Attorney, Agent, or Firm*—Kathleen E. Marsman; Borden Ladner Gervais LLP

(57) ABSTRACT

A continuous process for separating components of flaxseed is described. Flaxseed is dried to a moisture content of from about 0.5% to about 3.0%, after which is introduced into a separation chamber having an abrasive rotator therein. As the flaxseed passes over the abrasive rotator, contact with rotator separates the flaxseed components into hulls and kernels. Hulls and kernels are separated and may be used in this form or processed further. Hulls may be further processed by extraction with water and with hexane to remove flaxseed gum and oil, respectively. These two extractions may be done in any order. The process results in a lignan-rich component of flaxseed, a gum extract and oil. These separate components of flaxseed may be used in products such as feed, personal care products or nutraceuticals.

3 Claims, 6 Drawing Sheets

OTHER PUBLICATIONS

Steven C. Cunnane et al., "Nutritional atributes of traditional flaxseed in healthy young adults", AM J Clin Nutr, vol. 61, pp. 62-68, 1995.

W. Steve Cui, "Flaxseed: A functional Food for the 21st Century", Canadian Chemical News, pp. 19-20, May 1998.

P.J. Wood and M.U. Beer, "Functional Oat Products", Functional Foods: Biochemical & Processing Aspects, Technomic Publishing Co., Inc., Lancaster P.A., Ppl. 37.

Paula D. Nesbitt et al., "Human metabolism of mammalian lignan precursors in raw and processed flaxseed", Am J Clin Nutr., vol. 69, pp. 549-555, 1999.

Lilian U. Thomspon, "Experimental studies on lignans and cancer", Balliere's Clincial Endocrinology and Metabolism, vol. 12, No. 4, pp. 691-705, Dec. 1998.

Lilian U. Thompson et al., "Flaxseed and its lignan and oil components reduce mammary tumor growth at a late stage of carcinogenesis", vol. 17, No. 5, pp. 1373-1376.

* cited by examiner

PROCESS AND APPARATUS FOR FLAXSEED COMPONENT SEPARATION

This application claims and is entitled to the benefit of priority from and is a continuation-in-part of U.S. patent application Ser. No. 10/013,494 filed on Dec. 13, 2001, now abandoned the entirety of which is herein incorporated by reference.

FIELD OF THE INVENTION

This invention is related to the field of flaxseed processing, and in particular, a continuous dehulling process, fractionation of the dehulled products, and extraction and production of useful products for applications as ingredients for nutraceuticals, functional foods, feeds and other food and non-food products.

BACKGROUND OF THE INVENTION

Flaxseed is one of the major crops in Western Canada, Northern United States, South America and some European countries. Conventionally, flaxseed is processed into oil and the meal is used as an animal feed. Recently, flaxseed has become of increased importance in the Western diet as it contains a number of nutrients that are highly beneficial to human health. These include flaxseed oil (42–46%) which has high levels of linolenic fatty acid (55–59%), dietary fibre (24–28%) and lignans (0.5–1%), plus proteins (22–25%) and other minor components (Carter 1993, Potential of Flaxseed and Flaxseed Oil in Baked Goods and Other Products in Human-Nutrition. Cereal Foods World, 38(10): 753–9; and Cui 1998, Flaxseed: a functional food for the 21st century. Canadian Chemical News, May Issue). Linolenic fatty acid is the essential fatty acid which can reduce the risk of heart disease (Cunnane et al. 1995, Nutritional attributes of traditional flaxseed in healthy young adults. Am J. Clin. Nutr. 61(1):62–68). Dietary fibre can control the levels of blood glucose and glycernic response (Cui 1998; Wood and Beer 1998, Functional oat products. In Functional Foods: Biochemistry & Processing Aspects. Technomic Publishing Company, Inc. Lancaster, Pa. Pp1–37). Evidence has shown that flaxseed and its extracts containing high levels of lignans and its hydrolysate, secoisolariciresinol diglycoside (SDG), can prevent and slow the growth of cancer cells (Thompson et al. 1996, Flaxseed and its lignan and oil components reduce mammary tumor growth at a late stage of carcinogenesis. Carcinogenesis, 17(6):1373–1376).

All these beneficial properties exhibited by flaxseed have stimulated numerous research papers and patents for extracting the useful components from flaxseed and its applications in food and pharmaceuticals. Prior processes are disclosed in Canadian Patent No. 2,167,951 (Cui and Mazza) which issued on Apr. 30, 2002 and Canadian Patent Application No. 2,304,303 (Myllymaki), filed on Mar. 31, 2000. This patent and patent application disclose laboratory scale methods that include a dehulling process for flaxseed. These laboratory scale methods are small scale, batch type dehulling processes for separating flaxseed into hulls and kernels and the subsequent extraction of useful components from the fractionated products. These processes are useful for small batches of less than 100 g per batch but are not useful for commercial scale processing of flaxseed.

Other prior documents disclose techniques for the extraction, isolation, and purification of lignans from flaxseed meal and its constituent component SDG. An example of such techniques is disclosed in U.S. Pat. No. 5,705,618 (Westcott et al.). Further documents disclose the application of lignans and SDG for improving human health (Thompson et al., 1996; Thompson 1998, Experimental studies on lignans and cancer. Baillieri's Clinical Endocrinology and Metabolism 12(4): 691–705; U.S. Pat. No. 5,846,944 to Prasad; and U.S. Pat. No. 5,837,256 to Clark et al.).

The desirable components of the flaxseed are distributed in different locations in flaxseed. For example, lignans and gums are found only in the hulls while most of the proteins and oils are in the kernel (Cui and Mazza, Canadian Patent No. 2,167,951). Therefore, the dehulling process provides an efficient method for a comprehensive utilization of flaxseed at the maximum potential and adds values to the crop. Without the dehulling process, the extraction of lignans from flaxseed meal is much less efficient and more complex, and it is not suitable for commercial production.

The prior processes disclosed in these documents are not suitable for commercial scale production of flaxseed and the commercial extraction of its components. For example, the dehulling process of flaxseed described in the above-mentioned documents are small scale batch type processes which can only process less than 100 grams of flaxseed per batch. At this scale, the commercial production of flaxseed components is not economically feasible.

Further, the extraction of lignans from the hull fraction as shown in these prior art processes is inefficient. Such extractions do not extract all of the available lignan. Much of it is left in the hull fractions and therefore wasted. Conventional extraction processes for hull fractions used in the art involve initial extraction of oil with hexane, followed by lignan extraction with alcohol, and gum extraction using water, leaving a residue of protein and insoluble fibre. This prior art sequence of extractions does not give rise to a lignan-rich fraction from flaxseed hull. There is therefore a need for a process for producing a lignan-rich component which extracts or uses substantially all of the lignan in the hull fraction of the flaxseed. See, for example, the publication of Nesbitt et al., 1999. Human metabolism of mammalian lignan precursors in raw and processed flaxseed. Am. J. Clin Nutr. 69:549–55.

Most animals are not tolerant of whole flaxseed and/or are unable to break down flaxseed to any significant extent within the intestinal tract. In order for such animals to derive benefit from flaxseed components, it would be beneficial to provide a process that could separate flaxseed components prior to including such components into feed.

Therefore, there is a need for a large scale process suitable for commercial production of flaxseed and for the production of nutraceutical products. There is also a need for a commercial production process which is economical.

SUMMARY OF THE INVENTION

It is an object of the present invention to obviate or mitigate at least one disadvantage of previously described methods for separating flaxseed components. Further, it is an object of one aspect of the invention to provide a method of preparing a lignan-rich flaxseed component The present invention provides for a continuous process for the processing of flaxseed on a pilot plant scale as well as a process for the production of lignan-rich flaxseed product. The process according to the invention occurs in a continuous manner, and advantageously allows rapid processing of flaxseed on an industrial scale compared to prior art processes which allow for batch processing of only up to about 100 g of flaxseed. The inventive process allows for the processing of 200 kg or more of flaxseed in a continuous process.

According to the invention, there is thus provided a continuous process for separating hulls and kernels of flaxseed comprising the steps of: (a) drying the flaxseed to reduce the moisture content to a level ranging from about 0.5% to about 3%; (b) continuously introducing dried flaxseed into a separation chamber having an abrasive rotator therein; (c) flowing the dried flaxseed past the abrasive rotator at a rate sufficient to allow dehulling of flaxseed during contact with the abrasive rotator, producing hulls and kernels; and (d) separating the hulls and kernels. Optionally, the additional step of obtaining flaxseed flour from within the separation chamber can be included in the process, by removal of hulls and kernels.

In further aspect, the present invention provides a process for producing separate components from flaxseed hulls comprising the steps of: (a) drying the flaxseed to reduce the moisture content to a level ranging from about 0.5% to about 3.0%; (b) continuously introducing dried flaxseed into a separation chamber having an abrasive rotator therein; (c) flowing the dried flaxseed past the abrasive rotator at a rate sufficient to allow dehulling of flaxseed during contact with the abrasive rotator, producing hulls and kernels; (d) separating the hulls and kernels; (e) extracting the hulls to remove flaxseed gum and oil, producing a high-gum fraction, a hull oil fraction, and a lignan-rich component of flaxseed.

The invention further provides an apparatus for separating hull and kernel components of flaxseed. The apparatus comprises a separation chamber into which dried flaxseed is introduced. The chamber has a flaxseed inlet and a flaxseed component outlet. An abrasive rotator is disposed within the separation chamber, and has an axis of rotation extending between the inlet to the outlet of the separation chamber. The abrasive rotator contacts the flaxseed while rotating to breaking flaxseed into hulls and kernels. A sieve is disposed within the separation chamber surrounding the abrasive rotor, which for separates flaxseed components by size exclusion. A flow controller is included in the apparatus for allowing flaxseed to be maintained within the separation chamber until adequate separation of hull and kernel components is achieved.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Figure 1:
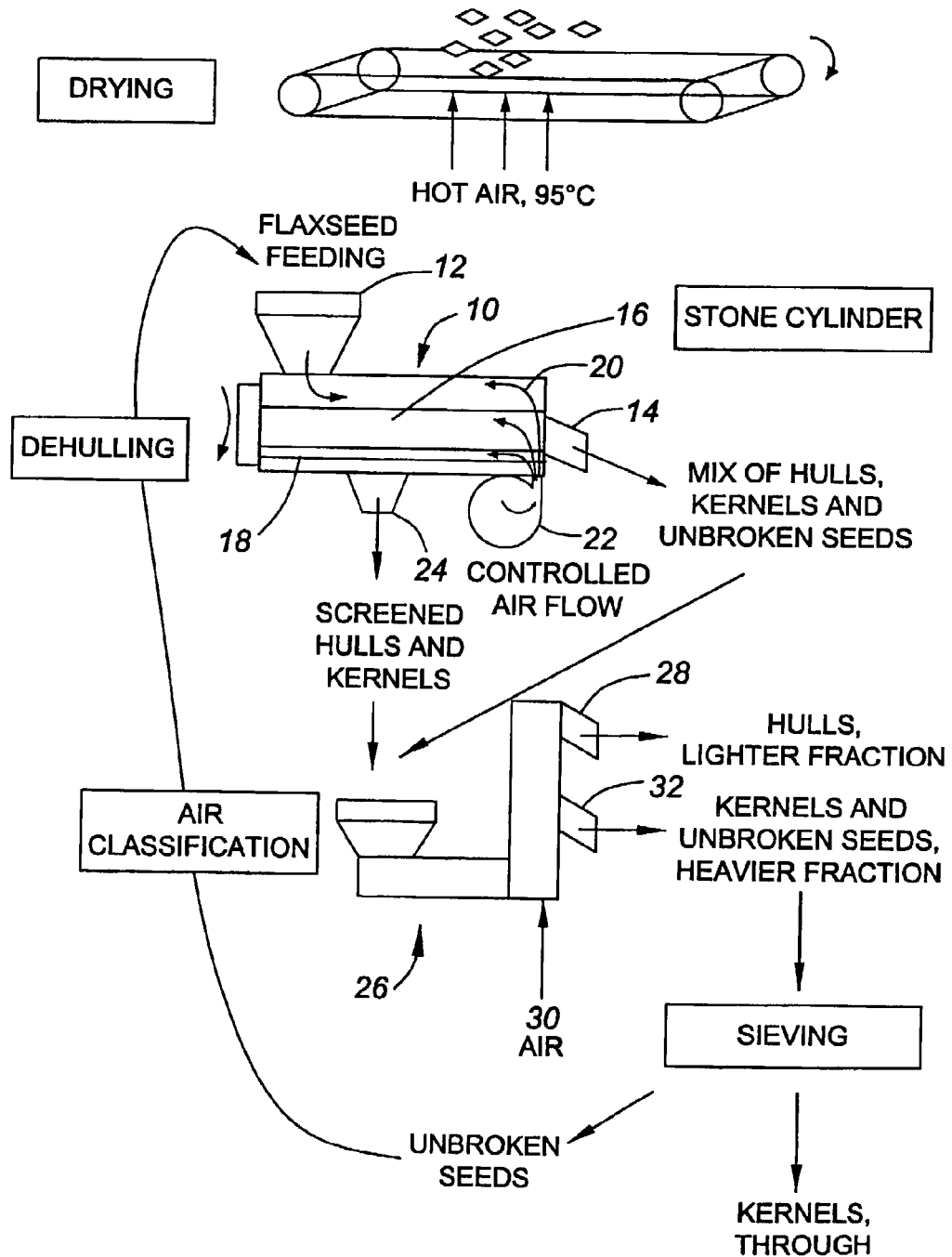
FIG. 1 provides a schematic view of the process and apparatus according to the invention.

The present process allows for the processing of flaxseed on an efficient, pilot plant or commercial scale. The process results in isolation of highly desirable products produced from flaxseed.

A continuous dehulling process is described wherein the flaxseed hull is separated from the kernel. The flaxseed components may then be subject to extraction to produce desired products including a product which is high in lignan. Further, a process for separating flaxseed hull components is provided which results in a lignan-rich flaxseed hull fraction.

The invention provides a continuous process for separating hulls and kernels of flaxseed. The flaxseed is dried to reduce the moisture content to a level of from about 0.5% to about 3.0%. Dried flaxseed is continuously introduced into a separation chamber having an abrasive rotator therein. While in the separation chamber, the dried flaxseed flows past the abrasive rotator at a rate sufficient to allow dehulling of flaxseed during contact with the abrasive rotator. This abrasion breaks the flaxseed and ultimately separates whole seeds into hulls and kernels. The hulls and kernels are then separated and may be used for any purpose desired.

The flow rate of flaxseeds into the chamber can be controlled by a variety of means, such as either by introducing an air current into the separation chamber, or by introducing flaxseed hulls into the separation chamber with the flaxseed. An exemplary flow rate of flaxseed through the separation chamber is about 250 grams/minute.

Once hulls and kernels are separated, they may be isolated from each other by any acceptable method. For example, a specific gravity separator can be used to separate the hulls and kernels. Alternatively, an aspirator or a sieve can be used to separate the hulls from the kernels.

The separation chamber may include a mesh surrounding the abrasive rotator for sieving the flaxseed as it is dehulled. The mesh may be from about 25 to about 50 mesh, and more preferably may be from 30 to 40 mesh. An optimum mesh size of 40 is suitable for the typical sized flaxseed.

The invention also pertains to components of flaxseed separated according to the inventive process. For example, a flaxseed hull or a flaxseed kernel obtained according to the process of the invention also fall within the scope of the invention. These isolated components may go on to further processing.

The invention also provides a process for producing separate components from flaxseed hulls. This process involves removing a high-gum fraction and a high-oil fraction from the isolated hull, either by serial extraction with water followed by hexane to remove oil first and then gum, or with hexane followed by water, to remove the oil fraction first and the gum fraction second. The order in which the gum and oil fractions are removed can be interchanges. However, when flaxseed hulls produced and isolated as described above are first extracted with water to remove flaxseed gum, a high-gum fraction and a low-gum hull fraction are formed. The low-gum hull fraction can then be further extracted with hexane to remove oil, thereby producing flaxseed hull oil and a lignan-rich component of flaxseed. The reverse order of extractions may also be conducted.

Thus, the invention also relates to the isolated hull components formed as above, specifically, a lignan-rich component of flaxseed, a high-gum hull fraction of flaxseed, and a flaxseed hull oil. The lignan-rich component may containing about 2 to 10 times the amount of lignan by weight than the starting seeds, when prepared according to the invention, which is a higher content than can be achieved according to prior art methodologies. Products for use as food, animal feed, for personal care, or as a nutraceuticals may be formulated having any of the flaxseed hull components contained therein, or having the whole hull or kernel components contained therein. Food products for humans such as functional foods, enriched foods, animal feeds, or pet foods may be formulated. In particular, the lignin-rich flaxseed hull component may be used in preparation of a nutraceutical for treatment or prevention of cancer.

The invention may be used to formulate flaxseed components for use in animal feed products or supplements. Such products may be used to feed an animal so that the animal derived benefit from consuming a high quantity of omega-3 fatty acid, or other component of flaxseed. In this way, an animal having a high omega-3 fatty acid tissue content may be produced, which may be desirable for consumers. For example, in this way, the omega-3 fatty acid content of meat, fish, poultry, eggs or milk may be increased. This is particularly beneficial for those animals unable to tolerate and/or break down whole flaxseeds within their intestinal tract. Prior to the instant invention, there was no practical way to formulate flaxseed fractions for animal feed on a practical and affordable scale.

An apparatus for separating hull and kernel components of flaxseed is also disclosed herein according to the invention. The apparatus has a separation chamber into which dried flaxseed is introduced. The chamber has a flaxseed inlet and a flaxseed component outlet. An abrasive rotator is disposed within the separation chamber having an axis of rotation extending between the inlet to the outlet of the separation chamber. The abrasive rotator contacts the flaxseed while rotating to breaking flaxseed into hulls and kernels. A sieve is disposed within the separation chamber surrounding the abrasive rotor for separating flaxseed components by size exclusion. A flow controller is included in the apparatus for allowing flaxseed to be maintained within the separation chamber until adequate separation of hull and kernel components is achieved.

According to the invention, any type of air flow would be used as the air current introduced into the separation chamber. For example, the air flow could be counter-flow air (in a direction opposed to the direction in which the seeds travel through the chamber), vertical flow air, or merely turbulent air flow that provides no particular direction, but serves to turbulently mix the content of the chamber.

In one exemplary embodiment, which should not in any way be considered limiting to the invention, the apparatus comprises a counter-flow air stream as the flow controller. The counter-flow air stream enters the chamber through a counter-flow inlet disposed near the flaxseed component outlet end of the separation chamber to allow air flow in a direction from the outlet to the inlet.

Continuous Dehulling Process. The first step in the process is a continuous dehulling process. The flaxseed is first dried to reduce moisture content. An acceptable moisture content for the inventive process is up to 3%. A low moisture content of the flaxseed is beneficial to the process. The preferred range of dryness is from 0.5% to 3% moisture. The preferred moisture content for optimum dehulling is about 1%. A moisture content of up to about 3% will work well with the invention, and a moisture content of less than about from 0.5% to 1% would work well, although the time and incremental energy required to increase the dryness of the flaxseed beyond 0.5% to 1% will not necessarily improve the efficiency of the process.

The dried flaxseed is introduced into a separation machine in a continuous manner. The separation machine has a processing chamber with an abrasive rotator therein. The abrasive rotator is interchangeably referred to herein, as well as in the art as a "rotating stone". The term "rotating stone" does not limit the rotator to being formed of any particular material, but merely implies that the rotator has the hardness and abrasive characteristics of a stone.

A mesh screen surrounds the rotating stone. This mesh screen ensures that particles smaller than a particular size are allowed to fall through. A mesh size of from 25 to 50 mesh may be used with the invention, and the optimal size, based on a typical flaxseed size is about 40 mesh.

The flaxseed enters the chamber and is dehulled by abrasion against the surface of the stone. The flow rate of the flaxseed into the processing chamber must be controlled to allow for sufficient time for the flaxseed to contact the stone and become dehulled. By controlling the flow rate of the flaxseed, a faster continuous speed of flow can be maintained with efficient dehulling of the flaxseed. The chamber may be horizontal, or may be angled from the horizontal to allow for gravity to coax flaxseed and isolated components toward the outlet end of the chamber. Alternatively, the chamber may be set more toward the vertical, provided that a counter-force such as a force provided by a counter-current air flow (for example, a vertical flow) allows for control of the rate of passage of the flaxseed through the chamber.

The shape of the abrasive rotator may be any acceptable shape to allow for rotation within the chamber without direct contact with the mesh screen. The abrasive rotator may be tubular or cylindrical, and may also be tapered along its axis to influence movement of the flaxseed through the chamber. For example, the abrasive rotator may have a wider diameter at the inlet than at the outlet end of the chamber. This design would coax the flaxseed toward the outlet end of the chamber when the rotational axis of the abrasive rotator is effectively horizontal.

In one example of a the invention, about 200 kg of brown flaxseed were dried in a continuous tunnel dryer at 95° C. for 30–60 min to reduce the moisture content of the sample to less than 1%. The dried flaxseed was cooled to room temperature at about 22–25° C. It was then introduced into a separation chamber adapted from a rice whitening machine (obtained from Satake, Japan). This adapted machine has a separation chamber containing a cylindrical stone having a horizontal rotational axis. The stone has a radius of approximately 20 cm and is approximately 70–80 cm long. The rotating speed of the stone is approximately 1450 rpm. A screen covers the stone. The dried flaxseed, having an average size of approximately 3–6 mm, enters the processing chamber and contacts the coarse stone. The mechanism of abrasion of the flaxseed against the surface of the stone dehulls the flaxseed. The screen has openings of approximately 0.98 mm in width, and about 2 cm in length, which therefore allows the hulls and kernels to be sieved out while the whole flaxseed remains inside for continuous dehulling.

The rate of movement of the seed through the separation chamber in this example is about 250 grams/minute. By adjusting the size of the rotating stone and the length of the chamber, greater flow rates are achieved. For example, by doubling the length of the stone and increasing the surface area (diameter of the stone) 2-fold, the flow-rate of the flaxseed can be increased to 1–2 kg/minute. In order to achieve maximum efficiency, the flow rate of flaxseed into the processing chamber can be adjusted. If the flow rate of flax seed is too fast, the flaxseed will not have sufficient time to contact the stone and will remain intact at the outlet. For continuous processing of 200 kg of flaxseed, the flow rate for entry of flaxseed into the chamber may be controlled at about 250 grams/min. The desired flow rate can be established for each different apparatus, depending on the parameters of the processing chamber, such as the surface area and abrasiveness of the abrasive roll.

A variety of methods may be used to control the flow rate of the seeds in the processing chamber. The flow-rate controlling step can be conducted in any way that allows a control in the rate of passage of flaxseed, and is not limited to the following embodiments. The length of time required for seeds to remain in the chamber depends in part on the length of the chamber and contact time with the stone required to achieve the desired separation. One of skill in the art can determine whether the desired separation of components is achieved, and can adjust flow rate accordingly.

One method which may be used to control the flow rate of the seeds is to introduce an air current into the processing chamber so as to increase the contact time between the flaxseed and the surface of the stone.

An alternative method of flow-rate control is to mix flaxseed with flaxseed hulls or another light material prior to or during introduction of flaxseed into the chamber. Such "light material" may include hulls from other grains, such as rice or oats. This light material combines with the flaxseed in the chamber, and allows the seed to bounce around more readily within the chamber. Further, hulls or other light material can have the effect of changing the flow of the seeds through the chamber, if a slower or faster rate is desired.

In the case where flaxseed are mixed with flaxseed hulls or hulls from another grain, a ratio ranging from 100:1 to 1:10 seed:hull may be used, depending on the desired outcome. Because the density of the hulls is much lighter than that of the seeds, the mechanical force from the rotating stone is applied to the hulls in the processing chamber thereby slowing down the flow rate of the flaxseed and increasing the time the flaxseed contacts the surface of the stone. An exemplary ratio of 2:1 seed:hull may be used. Increased quantities of hulls in this ratio will increase the amount of time flaxseeds spend in the processing chamber, and the rate of production is slowed.

Separation of Flaxseed Hulls from the Kernels. The dehulling, air classification and sieving processes according to the invention using an apparatus according to the invention is illustrated in FIG. 1. The initial step of drying the flaxseed is conducted according to any known method, such as by application of hot air to the flaxseed. Dried flaxseed is fed into a separation chamber (10) having a flaxseed inlet (12) and a flaxseed component outlet (14). Flaxseeds contact an abrasive rotator, such as a stone cylinder (16). The stone cylinder rotates about an axis, which in this embodiment is a horizontal axis. This axis may be graded away from the horizontal so as to encourage movement of flaxseed in a particular direction. Spaced apart from the rotor is a mesh screen (18) which is able to separate desired components of a given size.

In this embodiment, as an example which should not be considered limiting to the invention, an air flow or counter-current (20) is generated by a flow controller (22) to flow air in the opposite direction to that in which the flaxseed travels from the inlet (12) toward the outlet (14). Thus, control of the counter-current allows the speed with which the flaxseed moves through the separation chamber to be controlled.

By slowing the rate of seed flow through the chamber, seed can be more completely broke apart. Seeds which have been broken apart and reduced to hull and kernel components of a size that fits through the mesh screen (18) are removed from the chamber through a post-screen outlet (24). The mixture obtained from the outlet (14) of the separation chamber contains both hulls and kernels from the flaxseeds. It therefore needs to be separated into hull and kernel fractions. This separation is preferably carried out using a specific gravity separator, and/or an air classification flow or aspirator, and/or a sieve.

Those portions of the hulls and kernels and unbroken seeds which are not screened out are removed from the flaxseed component outlet (14), and are sent on to be further separated air classification or specific gravity separation in a component separator (26). In this case, the component separator uses air classification to separate lighter hull components from heavier kernels and unbroken seeds. The lighter components are blown upward to an upper outlet (28) by an air flow (30) while the heavier components are blown upward to a lower outlet (32).

To ensure completeness in the process according to the invention, the heavier components arising from the lower outlet may be sieved and divided into unbroken seeds and kernels which can go back to the dehulling process in the separation chamber.

The hull fraction obtained from the upper outlet (28) can go on to extraction using any known method, or by using the method described herein.

With the specific gravity method, the specific gravity separator will separate out the hulls and kernels into preferably five fractions based on the differences of the specific gravity between the hulls and the kernels. The light end fraction is the pure hull fraction, while the heavy end fraction contains mostly kernels and some unbroken seeds. The remaining fractions contain a mixture of hulls and kernels, although the content of kernels is much less than the original mixture. One of the remaining fractions is a fine flaxseed powder comprising a mixture of small pieces of hull and broken kernels. This portion resembles a fine dust or flour. This fine flaxseed powder comprises a mixture of small pieces of hull and broken kernels may also be used, for example as a feed supplement or a food component.

As an alternative to the specific gravity method of separation, as an example, an aspirator may be used. In the aspirator, the mixtures obtained from the dehulling process are passed through a column which has a terminal air velocity control. The column has a plurality of slides extending at an acute angle downward from the horizontal. For example, six slides may be used, each having a 35° angle extending downward from the horizontal. The mixture flows over a slide and to an air gap. An upward air current lifts the lighter particles and carries them to the top and out of the column. This process is repeated for each slide. In the example where there are six slides, the process is repeated six times (i.e. in each slide) before the aspirated product exits the bottom of the column. An air flow current of approximately 2.5 $m^3$/min gives an optimum separation of the hulls from the kernels.

The resulting products from either method of separation are separate fractions having hulls and kernels. These resulting fractions may then be treated further to produce a desired product for use in commercial applications.

Figure 2:
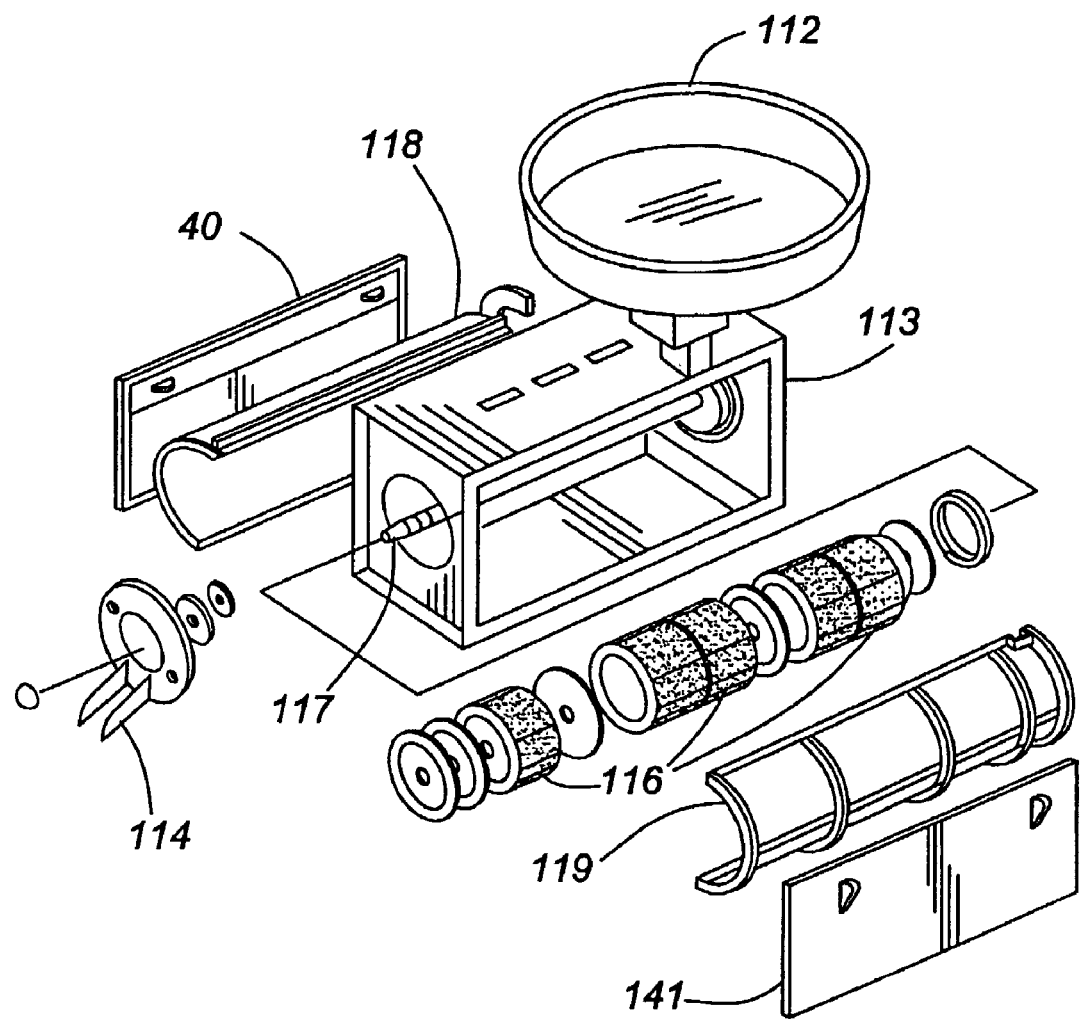
FIG. 2 illustrates an exploded view of a separation chamber according to the invention.

FIG. 2 illustrates the separation chamber according to the invention in an exploded view. The inlet (112) provides a point of entry into the housing (113) of the separation chamber. The abrasive rotator in this embodiment is represented by an abrasive roll (116) which is partitioned into separate portions along its horizontal axis. The roll rotates about an approximately horizontal axis (117) disposed within the housing. A mesh screen divided into two portions (118, 119) surrounds the roll within the housing. The inlet feeds flaxseeds directly to a location between the abrasive roll and the mesh screen. The screen size is about 0.95 to about 1.17 mm in width, by about 2.45 cm in length, which allows passage of smaller components, while retaining the intact flaxseeds adjacent the abrasive roll. Side covers (140, 141) may be removed from the housing (113) when removal of the screen or abrasive roll is required. The abrasive roll is held in place at the end of the housing, on which the outlet (114) is disposed. Any acceptable means may be used to allow rotation of the abrasive roll, and any motorized or manual means of driving the roll to rotate about its axis may be used with the apparatus according to the invention.

Figure 3:
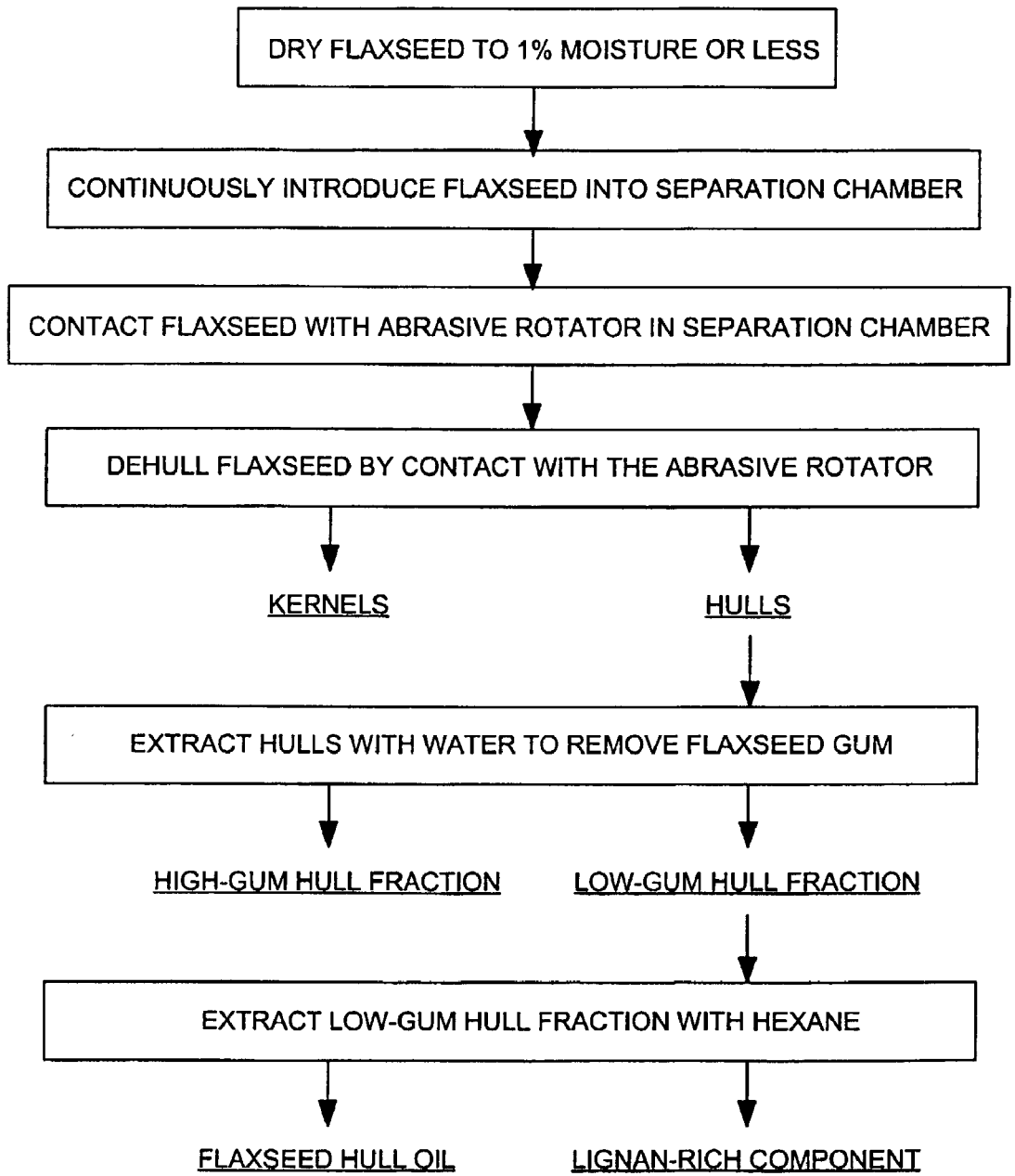
FIG. 3 provides a flow diagram representing the process of flaxseed component separation according to the invention.

Overall Process. The process according to the invention is typified by the flow diagram of FIG. 3. Initially, flaxseed are dried to from 0.5% to about 3% moisture, and optimally to 1% moisture (or less). The dried flaxseed is continuously introduced into a separation chamber. This continuous feed process distinguishes from other batch-mode operations which require more time in removing seed components from the chamber prior to undertaking a subsequent batch. Continuous introduction of flaxseed allows contact of flaxseed with an abrasive rotator within the separation chamber. Flaxseed is de-hulled by contact with the abrasive rotator. Extra hull may be introduced into the separation chamber at the same time as whole flaxseed if it is desirable to slow down the rate of seed separation or seed movement through the chamber. Ultimately, seeds are separated into kernels and hulls, although some whole seeds remain and are re-fed into the continuous flow separation chamber. Those hull fractions isolated according to the invention may be extracted with water or with hexane, in either order, in order to arrive at a lignan-rich component, a high-gum component and a flaxseed hull oil component. FIG. 3 illustrates the process where the gum is removed first and the oil is removed second, according to a reverse extraction process.

Reverse Extraction Process and the Production of a Lignan Enriched Product. The prior art methods of extracting lignan from the hull fraction of flaxseed are not efficient. Previously, the hull fractions were treated with hexane to remove oil, then treated with alcohol to extract the lignan components, followed by extraction with water to produce flaxseed gum. It was found that the extraction efficiency of the lignan with alcohol was low, and the method was time consuming.

In contrast, in the present invention, a resulting product which is higher in lignan is produced. The flaxseed is mechanically broken down to pass through a 40 mesh sieve in the dehulling process and separated out to form hull fractions. The hull fractions are treated with water to extract gum. The flaxseed gum is precipitated out of the water extract with 70% ethanol. The flaxseed gum may be used in a variety of products including personal care products.

The hull fractions are then treated with hexane to extract flaxseed oil. The lignans are enriched in the defatted hull. This lignan-rich component may further be milled to pass 100 mesh.

This resulting lignan-rich component is brown in color and can be processed into tablets or capsules as a nutrient supplement for human health. Flaxseed materials rich in lignans proved effective in preventing cancers and reducing the growth rate of cancer cells (Thompson et al., 1996).

Examples of the use of the lignan-rich component and the flaxseed gum in commercial products are given below.

Analysis of the Fatty Acid Composition of Flaxseed Hulls. Flaxseed contains oil high in linolenic fatty acid that is susceptible to oxidation and changes in composition under harsh conditions. It is therefore important to determine whether the dehulling process had any effect on the composition of the fatty acid. The fatty acid composition was completed according to the following method.

Figure 4:
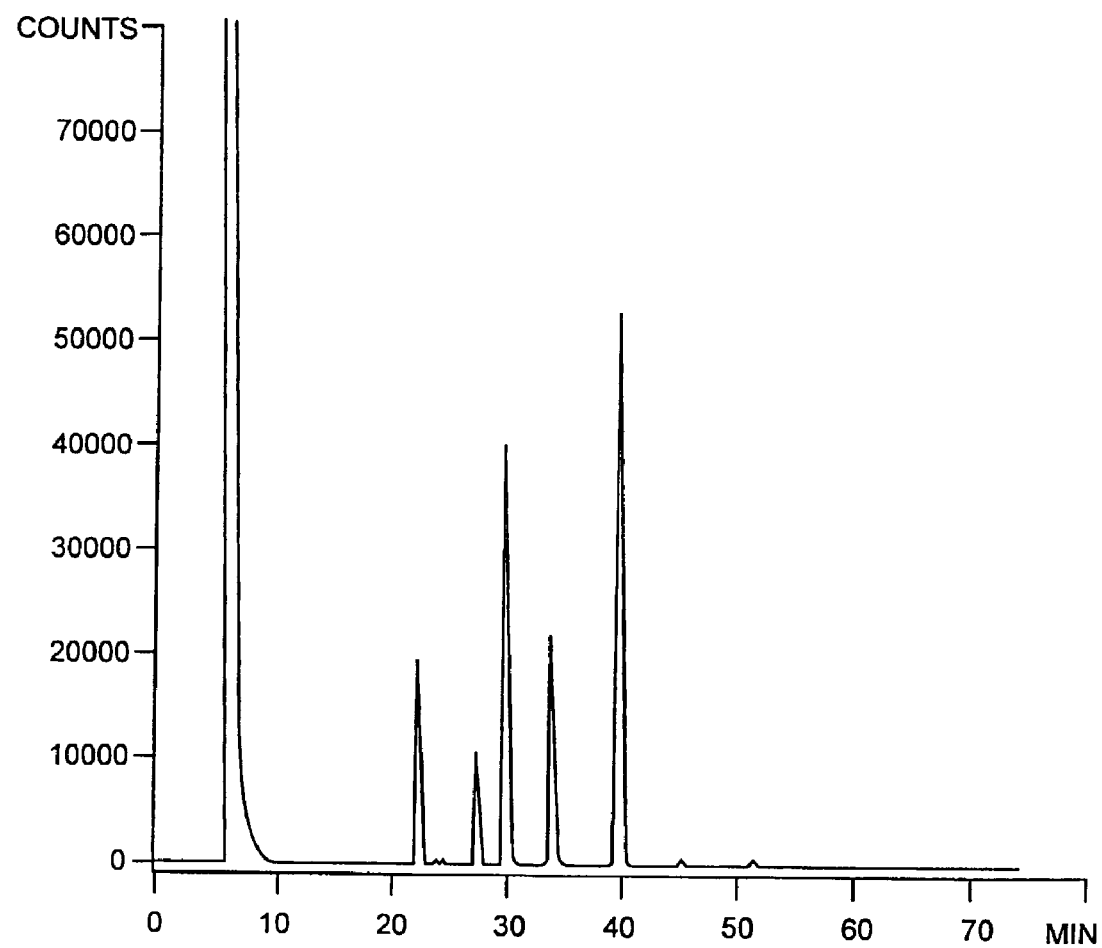
FIG. 4 shows the chromatography profile of fatty acids extracted from flaxseed hulls isolated according to the invention.

Flaxseed oil was extracted from the hull fraction obtained after specific gravity separation, according to the invention. Air classification is an alternative method of separation that may be used in accordance with the invention. The isolated hull fraction was extracted with $CH_2C_{12}$ and methanol (1:1) at room temperature for 6 hours. Kernel and whole seed fractions were also extracted for comparison with the hull fraction. The oil was saponized with NaOH and derivatized into fatty acid methyl esters. The derivatized fatty acid esters were analyzed on a GC, and the quantity of each fatty acid was calculated according to standards. The GC chromatography profile of the fatty acid from flaxseed hull is shown in FIG. 4. A comparison of the fatty acid composition of the oil from flaxseed components: the kernels, the hulls and the original (whole) seed is shown in Table 1. These results show that there is no significant change of the fatty acid composition of the oil in the hull after the dehulling process.

TABLE 1

Fatty acid composition of oil derived from flax seeds and seed components

| Seed tissue | Fatty acid composition | | | | |
| --- | --- | --- | --- | --- | --- |
| | Palmitic | Stearic | Oleic | Linoleic | Linolenic |
| Kernel | 5.1* | 4.7 | 17.6 | 14.0 | 58.6 |
| Testa and endosperm Hull | 8.6** | 1.9** | 18.3 | 12.5 | 58.6 |
| Weighted av.*** Whole seed | 6.1 | 4.1 | 17.4 | 14.3 | 58.0 |

*Significantly different from weighted average at P = 0.05
**Significantly different from weighted average at P = 0.01
***Average based on actual amount of oil in each component.

Figure 5:
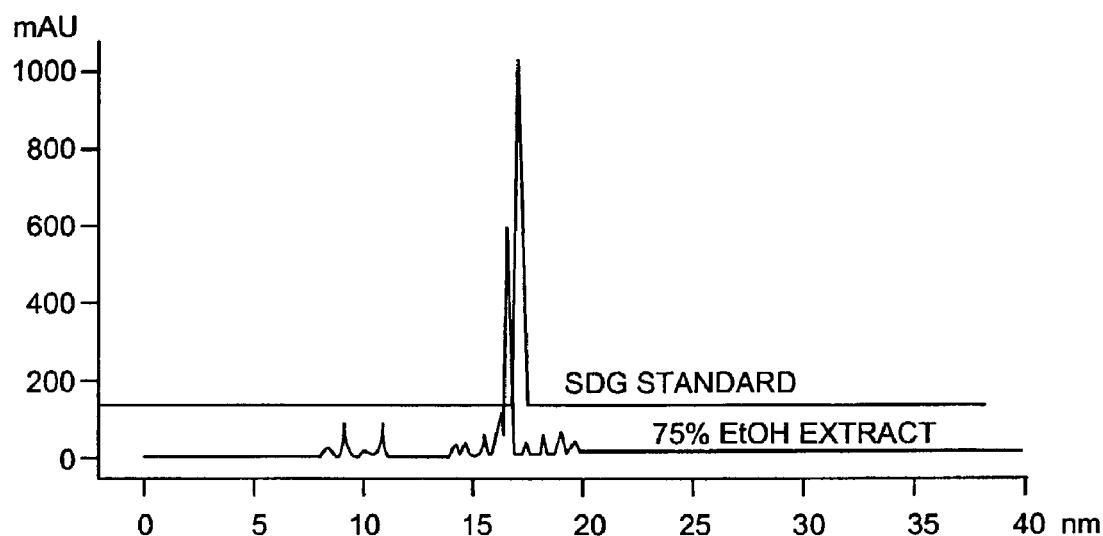
FIG. 5 shows chromatograms for SDG from the lignans extracted from processed flaxseed hulls and SDG standard.
Figure 6:
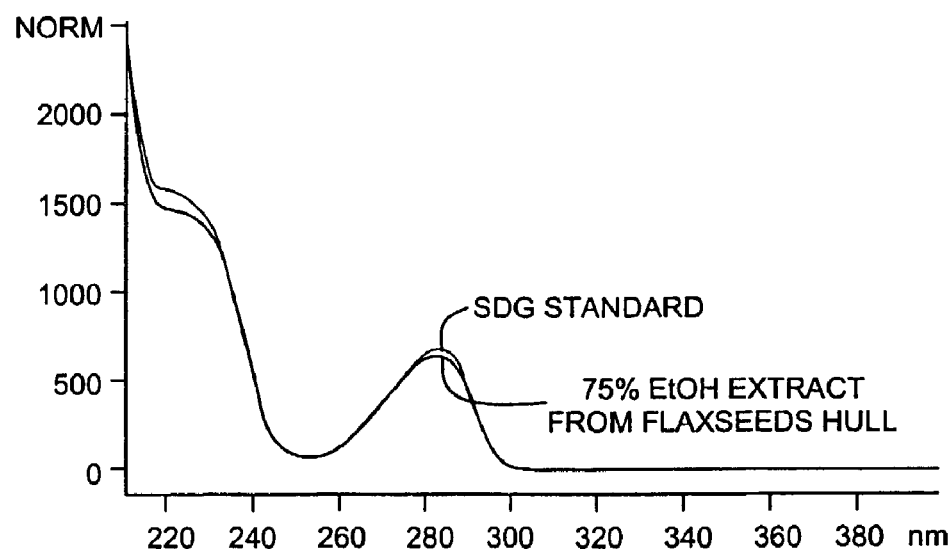
FIG. 6 shows the comparison of the UV spectra of the SDG obtained from flaxseed hull extract and SDG standard.

Analysis of Lignans in Flaxseed Hulls and Lignan-Rich Flaxseed Products. The content of lignans in the original flaxseed, hulls and final lignan-rich residue was analyzed according to the following procedure:

The lignans were extracted using 1,4 dioxane at 60° C. for 36 hr. The supernatant was separated from the residue by centrifugation at 5000 rpm for 10 min. The supernatant was evaporated to dryness, then hydrolysed with 0.5 m NaOH at room temperature of about 22– 23° C. for 24 hours. The hydrolysate was acidified with 2M $H_2SO_4$ to pH 3. This solution was passed through a $C_{18}$ resin (1 g), washed with water 3 times to remove sugars and small polar molecules. The SDG was eluted with methanol and adjusted to a 10 ml volume flask for quantification. The prepared solution was analyzed on a HPLC with a $C_{18}$ column eluted with acetonenitrile. The content of SDG was quantified with a SDG standard (courtesy of L. U. Thompson, University of Toronto), as shown in FIG. 5. The UV spectrum of the peak at 18.5 min matches with that of the standard, as shown in FIG. 6.

Figure 7:
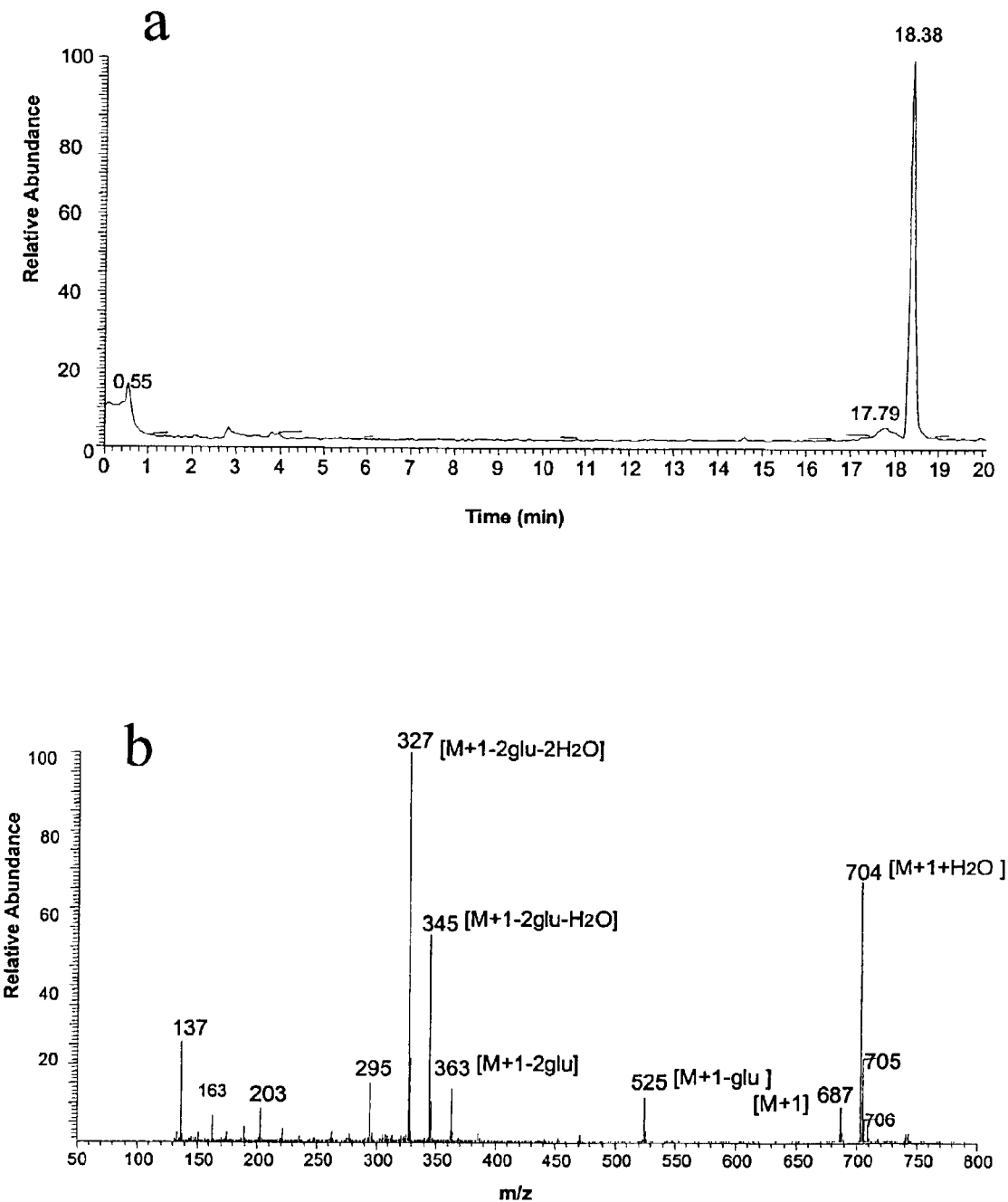
FIG. 7 shows the HPLC chromatography (a), and mass spectrum (b) of SDG extracted from flaxseed hulls produced by the dehulling process described herein.

FIG. 7 provides the HPLC chromatography (a), and mass spectrum (b) of SDG extracted from flaxseed hulls produced by the dehulling process described herein.

Lignan Tablet. An example of a tablet containing the lignan-rich component produced according to this invention was prepared according to the following procedure. 60 g of lignan-rich component was mixed in a blender with 22.2 g of corn starch, 17.4 g of fumed silica, and 0.4 g of magnesium stearate. A small portion of the mixed powder was transferred into a SPECACTM IR Press Cell (England) with a 13 mm diameter and 5 tons of pressure were applied to the Press Cell to obtain the tablet. The thickness and the weight of the tablet are adjusted as necessary.

Cosmetic and Personal Care Formulations Using Flaxseed Gum. An example of flaxseed gum used in cosmetic and personal care formulations is as follows. A unique moisturizing body wash was prepared by using the flaxseed gum extracted according to the process of the present invention and the ingredients listed in Table 2 below:

TABLE 2

Formulation Containing Flaxseed Gum*

| Phase | Ingredient | Percentage (by weight) |
|---|---|---|
| A1 | De-ionized Water | 59.225 |
| A2 | Flaxseed Gum | 0.20 |
| A3 | Laurauride DEA | 5.00 |
| A4 | Sodium Laureth Sulfate | 30.00 |
| A5 | Propylene Glycol (and/or) Diazotidinyl Urea (and/or) Methylparaben (and/or) Propylparaben | 1.00 |
| B6 | De-ionized Water | 1.00 |
| B7 | Citric Acid | 0.075 |
| C8 | De-ionized Water | 2.00 |
| C9 | Sodium Chloride | 1.20 |
| D10 | Fragrance | 0.300 |

*The International Nomenclature for Cosmetic Ingredients (INCI) names are used in the ingredient listing where applicable.

The ingredients in Phase A were added one at a time with agitation at room temperature. The ingredients in Phase B were pre-mixed and dissolved in a separate container and then added to Phase A. The ingredients in Phase C were combined, dissolved and then added to Phase AB prior to the mixing phase of AB. The mixed Phase ABC was further agitated and a desired fragrance was optionally added. The prepared body wash was clear and foamed well. It provided the skin with a moisturized feeling after use.

Food Formulation: Low Fat Flaxseed Muffin. A low fat flaxseed muffin was prepared according to the following formulation. The dry ingredients in this formulation are provided in Table 3.

TABLE 3

Dry Ingredients for Low-Fat Muffin Formulation Containing Flaxseed Kernel

| Ingredient | Amount (ml) |
|---|---|
| Preprocessed Flour* | 250 |
| Sugar | 250 |
| Wheat bran | 250 |
| Flaxseed kernel | 50 |
| Baking powder | 15 |
| Baking soda | 8 |

*wheat flour is baked in over at 250–275° F. for 2 hr and ground before use.

All the ingredients listed in Table 4 were mixed with a mixer until a homogeneous phase was obtained. This mixture is used as the dry muffin mix. For a portion of 18 medium sized muffins, 1 egg, 1000 mL water, and 1000 mL of the dry muffin mix are mixed together. After mixing all the ingredients homogeneously, the resulting mixture is baked at 400° F. for 25 min.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A continuous process for separating hulls and kernels of flaxseed comprising the steps of:
    (a) drying the flaxseed to reduce the moisture content to a level of from about 0.5% to about 3.0%;
    (b) continuously introducing dried flaxseed into a separation chamber having an abrasive rotator therein;
    (c) flowing the dried flaxseed past the abrasive rotator at a rate sufficient to allow dehulling of flaxseed during contact with the abrasive rotator, producing hulls and kernels; and
    (d) separating the hulls and kernels,
   wherein the flow rate in step (c) is controlled by introducing flaxseed hulls or a light material into the separation chamber with the flaxseed.

2. A process for producing separate components from flaxseed hulls comprising the steps of:
    (a) drying the flaxseed to reduce the moisture content to a level of from about 0.5% to about 3.0%;
    (b) continuously introducing dried flaxseed into a separation chamber having an abrasive rotator therein;
    (c) flowing the dried flaxseed past the abrasive rotator at a rate sufficient to allow dehulling of flaxseed during contact with the abrasive rotator, producing hulls and kernels;
    (d) separating the hulls and kernels;
    (e) extracting the hulls to remove gum and oil, producing flaxseed gum, flaxseed hull oil and a lignan-rich component of flaxseed,
        wherein the step of extracting the hulls comprises extracting the hulls with water to remove flaxseed gum, producing a high-gum fraction and a low-gum hull fraction; and extracting the low-gum hull fraction with hexane to remove oil, producing flaxseed hull oil and a lignan-rich component of flaxseed.

3. A process for producing separate components from flaxseed hulls comprising the steps of:
    (a) drying the flaxseed to reduce the moisture content to a level of from about 0.6% to about 3.0%;
    (b) continuously introducing dried flaxseed into a separation chamber having an abrasive rotator therein;
    (c) flowing the dried flaxseed pest the abrasive rotator at a rate sufficient to allow dehulling of flaxseed during contact with the abrasive rotator, producing hulls and kernels;
    (d) separating the hulls and kernels;
    (e) extracting the hulls to remove gum and oil, producing flaxseed gum, flaxseed hull oil and a lignan-rich component of flaxseed,
        wherein the step of extracting the hulls comprises extracting the hulls with hexane to remove oil, producing a high-oil fraction and a low-oil hull fraction; and extracting the low-oil hull fraction with water to remove flaxseed gum, producing a high-gum fraction and a lignan-rich component of flaxseed.

* * * * *